United States Patent
Rhoads et al.

(10) Patent No.: US 8,717,919 B2
(45) Date of Patent: *May 6, 2014

(54) SYSTEMS AND METHODS FOR SPACE-TIME DETERMINATIONS WITH REDUCED NETWORK TRAFFIC

(75) Inventors: Geoffrey Rhoads, West Linn, OR (US); Harrison Freer, Queensbury, NY (US); Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/184,308

(22) Filed: Jul. 15, 2011

(65) Prior Publication Data

US 2011/0274004 A1  Nov. 10, 2011

Related U.S. Application Data

(63) Continuation of application No. 12/370,466, filed on Feb. 12, 2009, now Pat. No. 7,983,185.

(51) Int. Cl.
  *G01R 31/08* (2006.01)
(52) U.S. Cl.
  USPC .......... 370/252; 370/503; 370/400; 370/324; 375/356
(58) Field of Classification Search
  USPC .......... 370/241, 252; 342/104–146, 350–465; 709/1–302
  See application file for complete search history.

(56) References Cited

U.S. PATENT DOCUMENTS

| | | | |
|---|---|---|---|
| 4,405,986 | A | 9/1983 | Gray |
| 5,045,861 | A | 9/1991 | Duffett-Smith |
| 5,539,398 | A | 7/1996 | Hall et al. |
| 5,838,279 | A | 11/1998 | Duffett-Smith et al. |
| 6,084,547 | A | 7/2000 | Sanderford et al. |
| 6,094,168 | A | 7/2000 | Duffett-Smith et al. |
| 6,275,705 | B1 | 8/2001 | Drane et al. |
| 6,529,165 | B1 | 3/2003 | Duffett-Smith et al. |
| 6,650,877 | B1 | 11/2003 | Tarbouriech et al. |
| 6,806,830 | B2 | 10/2004 | Panasik et al. |
| 6,894,644 | B2 | 5/2005 | Duffett-Smith et al. |
| 7,224,984 | B2 | 5/2007 | Agrawala et al. |
| 7,260,407 | B2 | 8/2007 | Duffett-Smith et al. |
| 7,315,745 | B2 | 1/2008 | Duffett-Smith et al. |

(Continued)

OTHER PUBLICATIONS

Enge, P. et al., "Special Issue on Global Positioning System," Proceedings of the IEEE, vol. 87(1), p. 3-15, Jan. 1999.

(Continued)

*Primary Examiner* — Bob Phunkulh
(74) *Attorney, Agent, or Firm* — Digimarc Corporation

(57) ABSTRACT

Space-time solutions are determined by exchanging pings among nodes in a network. Each ping includes a current space-time state of the transmitting node, which includes the transmitting node's currently estimated location and corrected time (as a count stamp). A particular node in the network receives pings from the other nodes in the network and uses the data in the received pings to estimate its own current position and to correct its own free-running clock relative to a common system time. As a service to the network, the particular node then transmits its corrected time (as a count stamp) and estimated position to the other nodes. In some embodiments, the space-time solutions discussed herein are used as backup to other navigation systems, such as the Automatic Dependent Surveillance-Broadcast (ADS-B) system.

15 Claims, 10 Drawing Sheets

(56) References Cited

U.S. PATENT DOCUMENTS

| | | | |
|---|---|---|---|
| 7,359,719 | B1 | 4/2008 | Duffett-Smith et al. |
| 7,382,804 | B2 | 6/2008 | Alapuranen et al. |
| 7,397,390 | B2 | 7/2008 | Dipiazza |
| 7,508,883 | B2 | 3/2009 | Duffett-Smith et al. |
| 7,593,736 | B1 | 9/2009 | Duffett-Smith et al. |
| 7,826,837 | B1 | 11/2010 | Sylvester |
| 7,876,266 | B2 | 1/2011 | Rhoads |
| 7,983,185 | B2 * | 7/2011 | Rhoads et al. ............ 370/252 |
| 8,463,290 | B2 | 6/2013 | Rhoads |
| 2001/0004601 | A1 | 6/2001 | Drane et al. |
| 2003/0001776 | A1 | 1/2003 | Hannah et al. |
| 2003/0014181 | A1 | 1/2003 | Myr |
| 2003/0054838 | A1 | 3/2003 | Carrez |
| 2003/0220117 | A1 | 11/2003 | Duffett-Smith et al. |
| 2004/0046693 | A1 * | 3/2004 | Ogino et al. ............ 342/357.08 |
| 2005/0137786 | A1 | 6/2005 | Breed et al. |
| 2007/0001903 | A1 * | 1/2007 | Smith et al. ............ 342/387 |
| 2007/0066231 | A1 | 3/2007 | Duffett-Smith et al. |
| 2007/0200759 | A1 | 8/2007 | Heidari-Bateni et al. |
| 2007/0247368 | A1 * | 10/2007 | Wu ............ 342/465 |
| 2009/0051568 | A1 | 2/2009 | Corry et al. |
| 2009/0061899 | A1 | 3/2009 | Hwang et al. |
| 2009/0073030 | A1 | 3/2009 | Hansen et al. |
| 2009/0111482 | A1 | 4/2009 | Rowe et al. |
| 2009/0213828 | A1 | 8/2009 | Brundage et al. |
| 2009/0228732 | A1 | 9/2009 | Budde et al. |
| 2009/0233621 | A1 | 9/2009 | Rhoads et al. |
| 2009/0273518 | A1 | 11/2009 | Duffet-Smith et al. |
| 2009/0281729 | A1 | 11/2009 | Duffett-Smith et al. |
| 2009/0313370 | A1 | 12/2009 | Rhoads |
| 2010/0045531 | A1 | 2/2010 | Rhoads |
| 2010/0202300 | A1 | 8/2010 | Rhoads et al. |

OTHER PUBLICATIONS

Braasch, M.S. et al., "GPS Receiver Architectures and Measurement," Proceedings of the IEEE, vol. 87(1), p. 48-64, Jan. 1999.

Misra, P. et al., "GPS Performance in Navigation," Proceedings of the IEEE, vol. 87(1), p. 65-85, Jan. 1999.

GPS Joint Program Office, "Naystar GPS Space Segment/Navigation User Interfaces," Navstar Global Positioning System, Interface Specification, IS-GPS-200, Revision D., ARINC Engineering Services, LLC, Dec. 7, 2004.

US. Joint Planning and Development Office (JPDO), Air Navigation Services Working Group, "FAA's Surveillance/Positioning Backup Strategy Alternatives Analysis." Paper No. 08-003, Jul. 15, 2008.

US. Federal Aviation Administration, "Fact Sheet—NextGen." Feb 14. 2007, available at <<http://www.faa.gov/news/fact_sheets/news_story.cfm?newsID=8145>>.

Notice of Allowance dated Jul. 25, 2012, and Notice of Allowance dated Dec. 17, 2012, in U.S. Appl. No. 12/426,787.

Appeal Brief dated May 3, 2012, in U.S. Appl. No. 12/373,944.

Examiner's Answer dated Jul. 24, 2012, in U.S. Appl. No. 12/373,944.

Notice of Allowance dated Jun. 13, 2012, in U.S. Appl. No. 12/429,030.

International Search Report and Written Opinion dated Oct. 1, 2012, in PCT/US2012/046265.

H. Feng et al., Positioning models and systems based on digital television broadcasting signals, Frontiers of Electrical and Electronic Engineering in China, vol. 2(4), p. 410-414, 2007.

Widnall et all, "Stability of the Decentralized Estimation in the JTIDS Relative Navigation", IEEE Transactions on Aerospace and Electronic Systems, vol. AES-19, No. 2, Mar. 1983.

Notice of Allowance dated Feb. 7, 2013, in U.S. Appl. No. 13/179,807.

* cited by examiner

| System | Requires separate avionics & antenna | Ground centric | Accuracy influenced by weather | Globally extensive | Other cons | Other pros |
|---|---|---|---|---|---|---|
| Radar | Yes | Yes | Modestly | No | Expensive to maintain. Accuracy a function of range. | Significant installed base. Protects against uncooperative aircraft. |
| LORAN | Yes | Yes | Significantly | No | Hi power required. Accuracy uncertain. | Maritime use. |
| INS | Yes (no antenna) | No | No | Yes | Inherent drift. Difficult calibration. | Integration with GPS mature. |
| DME/DME | Yes | Yes | No | No | Expensive to maintain. Accuracy limited. | Installed base. |
| VOR | Yes | Yes | No | No | Expensive to maintain. Accuracy limited. | Installed base. |
| *Multi-lateration | ??? | Yes* | No | ??? | Standards difficult to test. | |
| Terrain Reference | No | No | No | No | Extensive data collection and updating. | Emerging technology with promise. |
| PhaseNet | No | No | No | Yes | Standards verification. | Cost effective. |

FIG. 12

SYSTEMS AND METHODS FOR SPACE-TIME DETERMINATIONS WITH REDUCED NETWORK TRAFFIC

RELATED APPLICATION

This application is a continuation of U.S. patent application Ser. No. 12/370,466, filed Feb. 12, 2009, which is hereby incorporated by reference herein in its entirety.

TECHNICAL FIELD

This disclosure is related to object positioning systems. More particularly, this disclosure is related to a single network node that determines its own space-time solution based on data received from other network nodes with which the single node communicates.

BACKGROUND INFORMATION

Current techniques for positioning include the following:
Cellular: Global Positioning System (GPS), Assisted GPS (A-GPS), Time of Arrival (TOA), Radio Fingerprinting, Cell Global Identity, and Enhanced Cell ID.
WiFi: Radio Fingerprinting, WiFi TOA, and Wireless Access Point Wardriving.
GPS: Differential GPS (DGPS), Wide Area Augmentation System (WAAS), A-GPS, and Laser Augmentation.

GPS is a space-based satellite constellation that provides constant, global geopositioning to end users. A user's GPS device processes signals from three or more GPS satellites, and by way of trilateration provides latitude and longitude data. GPS may be global, but it is not ubiquitous because foliage, building edifices, and bridges block GPS signals. The absence of GPS signals in places such as the urban core is problematic because high value applications for reliable positioning abound, yet no reliable solution exists. The urban core in major cities is also known as the "urban canyon," because skyscrapers on both sides of the streets block GPS signals. Another common problem is multipath distortion in which signals bounce off many surfaces before reaching the user, resulting in vastly inaccurate positioning data.

In addition to providing navigation within the urban core, GPS is widely used to aid navigation worldwide. For example, GPS is a routine component of aviation navigation at all levels including the next generation air traffic control system referred to as Automatic Dependent Surveillance-Broadcast (ADS-B). See, <<http://www.faa.gov/news/fact_sheets/news_story.cfm?newsId=8145>> (last accessed Sep. 25, 2008). ADS-B is anchored on GPS derived position and velocity information. ADS-B takes advantage of GPS accuracy, reliability and global coverage to improve navigation performance for improved safety and efficiency. Because of satellite-based navigation (SATNAV) vulnerabilities, however, it is widely recognized that ADS-B must have a networked system-wide backup.

GPS was originally designed as a military system and has had recent broad adoption for civil and civilian uses due to its inherent accuracy and a strong history of reliable performance. Several other entities, including the European Union, Russia, India, China, and Japan have satellite-based Position, Navigation, and Timing. Collectively, the use of satellite-based navigation services is referred to a Global Navigation Satellite Systems (GNSS). GPS, however, remains the de facto system of choice, primarily because of its maturity, with over fifteen years of reliable free service. GPS acceptance has also been enhanced by open interface control documentation (ICD), which allows receiver manufacturers to confidently design systems against a reliable standard.

These satellite systems provide a very low cost-of-ownership for many applications including, for example, civil aviation management compared to traditional radar methods and have the added advantage of global coverage for international flights. However, because they are satellite-based, there is a danger that either natural or human threats to these systems could make them vulnerable to outages. Thus, there is considerable work going into a search for an aviation back-up system to provide navigation information in the event of GPS outage. See, for example, <<http://www.jpdo.gov/library/InformationPapers/ADS-B_Backup_Report_PDA.pdf>> (last accessed Sep. 26, 2008).

SUMMARY OF THE DISCLOSURE

Space-time solutions are determined by exchanging ping transmit events among nodes in a network. Each ping transmit event includes a current space-time state of the transmitting node, which includes the transmitting node's currently estimated location and corrected time (as a count stamp). A particular node in the network receives ping transmit events from the other nodes in the network and uses the data in the received ping transmit events to estimate its own current position and to correct its own free-running clock relative to a common system time. As a service to the network, the particular node then transmits its corrected time (as a count stamp) and estimated position to the other nodes.

In one embodiment, a method of determining location and timing information of a local node in a network includes receiving ping transmit events from a plurality of nodes in the network. Each ping transmit event includes a transmit count stamp corresponding to a remote time (based on an independent remote clock) when the respective node transmits the ping transmit event, and a remote location of the respective node at the remote time when the respective node transmits the ping transmit event. For each ping transmit event received within a predetermined number of local clock counts (based on an independent local clock), the method also includes associating a receive count stamp with the received ping. The method further includes processing the transmit count stamps, the remote locations, the receive count stamps, and the local locations corresponding to the ping transmit events received within a predetermined number of local clock counts to determine one or more clock solutions for correlating the independent local clock with a network time, and to determine one or more location solutions for estimating a new local location.

In another embodiment, a system for determining location and timing information includes a plurality of nodes in communication with one another. Each node includes an independent clock for generating count stamps, a communication device for receiving remote ping transmit events from the other nodes, and a processor. The processor is configured to associate each remote ping transmit event with a receive count stamp based on the independent clock. The processor is also configured to process the transmit count stamps, the remote locations, the receive count stamps, and the local locations to determine one or more clock solutions for correlating the independent clock with a network time, and to determine one or more location solutions for estimating a new local location.

Additional aspects and advantages will be apparent from the following detailed description of preferred embodiments, which proceeds with reference to the accompanying drawings.

BRIEF DESCRIPTION OF THE DRAWINGS

FIG. 12 illustrates a table that compares limitations and features of various SATNAV backup systems under consideration for aviation.

DETAILED DESCRIPTION OF PREFERRED EMBODIMENTS

Figure 1:
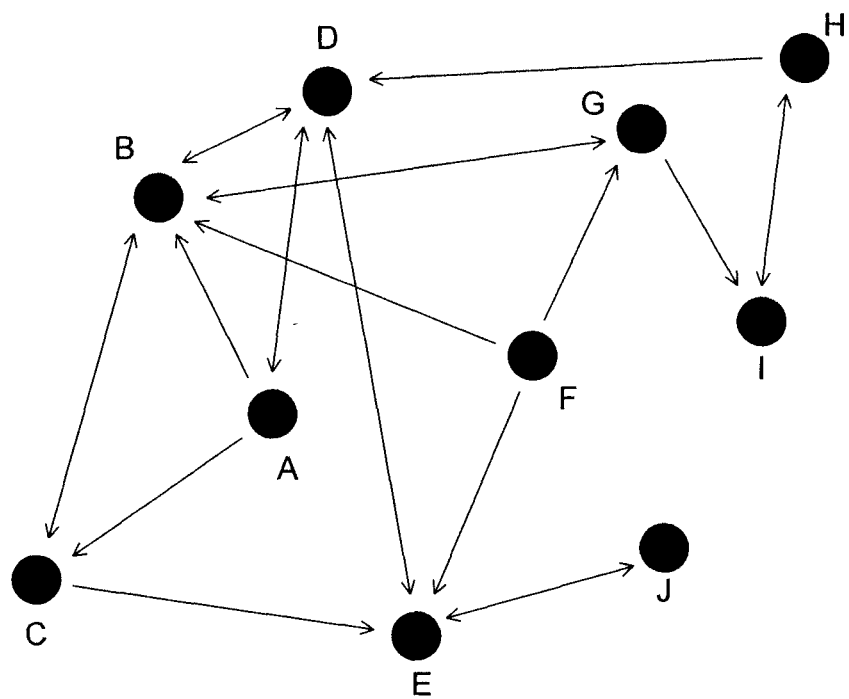
FIG. 1 illustrates a network of nodes according to one embodiment.

A precision timing/location technology referred to as "PhaseNet" is described in International Patent Application Publication No. WO/2008/073347, filed Dec. 7, 2007, by Geoffrey Rhoads (the "Rhoads application"). As discussed in detail below, certain applications of the PhaseNet technology exchange a large amount of information between nodes in a network in order for a particular node to determine its own space-time solution. In some applications of the PhaseNet technology, the amount of data required to be exchanged between nodes may be undesirable because it overly congests the network or exceeds the network's ability to timely communicate the data. Thus, certain embodiments disclosed herein provide an enhanced PhaseNet technology that substantially reduces the amount of data exchanged between nodes for space-time calculations.

In one embodiment disclosed herein, each node in a network transmits time stamped messages (ping transmit events) to other nodes in the network. Each ping transmit event includes a current space-time state of the transmitting node. The current space-time state includes the transmitting node's currently estimated location and corrected time (in the form of a transmit count stamp). A particular node P in the network produces ping receive events by receiving and associating receive count stamps to the ping transmit events received from the other nodes in the network. Node P uses the data in the received ping transmit events to estimate node P's current position and to correct node P's free-running clock relative to a common network system time. In one embodiment, the common network system time is defined as an average of the node clocks within the system. Artisans will recognize from the disclosure herein that many other system clock determination techniques are possible. For example, if one the system nodes operates with an atomic clock, that clock can establish the system clock with extremely small clock drift.

As discussed in detail below, ping transmit events received from a minimum number of other nodes may be required in certain embodiments in order for node P to derive a solution for correcting its current space-time state. As a service back to the network, node P in turn broadcasts its corrected space-time state (the newly estimated location and corrected time in the form of a count stamp) to the network as a ping transmit event for use by the other nodes in determining their own respective space-time solutions.

In certain embodiments, each node in the network includes an initial space-time state that provides a starting point for sending ping transmit events to the other nodes and for determining a solution for correcting its own space-time state. The initial space-time states may be provided using other timing/location systems and methods. For example, the initial space-times state may be provided by a GPS system or by using the PhaseNet technology described in the Rhoads application. As another example, a user may manually enter the initial space-time state into a node based on known methods for calculating time and location data based on observation. The initial state information may also include initial direction vectors between network nodes, as discussed below.

In certain embodiments, the enhanced PhaseNet technology disclosed herein is used as a backup to other timing/location systems that provide the initial space-time state to the nodes. In one example aviation embodiment discussed below, the enhanced PhaseNet technology disclosed herein is used as backup for an Automatic Dependent Surveillance-Broadcast (ADS-B) system to reduce vulnerability to GPS outages. During normal operation, for example, the ADS-B system uses GPS to provide timing and location information to aircraft. When GPS becomes unavailable, however, each ADS-B node (e.g., aircraft, airport control towers, communication stations, fixed beacons, and/or other devices in communication with the aircraft) determines its initial space-time state based on its last known time and location (e.g., as provided by the GPS before the outage). Each ADS-B node transmits its initial space-time state as a ping transmit event and receives ping transmit events from other ADS-B nodes. Each ADS-B node then uses its initial space-time state and the space-time states in the ping transmit events received from the other ADS-B nodes to update its own space-time solution. Thus, the embodiments disclosed herein allow ADS-B nodes to "ride through" periods of GPS outage with minimal degradation of system accuracy.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

General PhaseNet Overview

In general, the PhaseNet algorithms (discussed below) run on the nodes of a network, and messages passed between the nodes serve as input to the algorithms. FIG. 1 illustrates a network that includes ten nodes A, B, C, D, E, F, G, H, I, J according to one embodiment. The network 100 may include different numbers of nodes and nodes may be added to or removed from the network 100 at any time. In this example, it is assumed that some of the nodes move with respect to the other nodes. For example, some of the nodes may be located in moving vehicles such as automobiles or airplanes. Lines between nodes represent communication links (either a duplex link or a monoplex link). For simplicity, FIG. 1 does not show lines between each node. However, it is assumed that each node may establish duplex communication with any of the other nodes. Further, while the nodes in FIG. 1 are illustrated as being located in a two-dimensional plane, an artisan will recognize from the disclosure herein that nodes may be distributed in a three-dimensional space.

Figure 2:
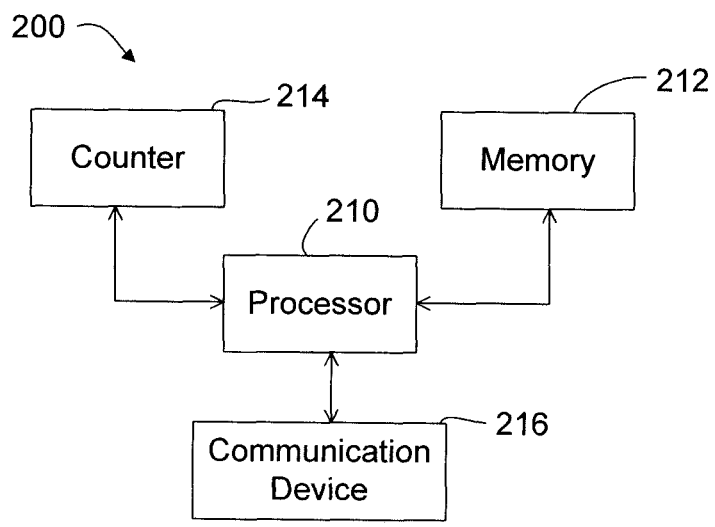
FIG. 2 is a block diagram of a node according to one embodiment.

FIG. 2 is a block diagram of a node 200 according to one embodiment. The node 200 shown in FIG. 2 may correspond, for example, to one or more of the nodes A, B, C, D, E, F, G, H, I, J shown in FIG. 1. The node 200 includes a processor 210 in communication with a memory device 212, a counter 214, and a communication device 216. The processor 210 may include, for example, digital signal processors, one or more field-programmable gate array (FPGA), general purpose single-chip or multi-chip microprocessors, special purpose processors, combinations of the foregoing, or the like. The memory device 212 may include, for example, random access memory (RAM), hard drives, drives that accept hard or floppy disks, tape cassettes, CD-ROM, DVD-ROM, or other computer-readable storage media. The memory device 212 includes program instructions that are executable by the processor 210 for determining space-time solutions as described herein. The memory device 212 may also include one or more databases (not shown) for storing data used to calculate the space-time solutions.

The communication device 216 is configured to provide communication with other nodes. In certain embodiments, the communication device 216 also provides an interface to other timing/location systems such as a GPS device. The communication device 216 may provide access to a variety of different types of networks that proliferate throughout our environment such as WiMax, WiFi, Cellular, Mesh Networks, Ad Hoc Networks, First Responder Radio, and Spaceborne systems such as Iridium and the GPS constellation itself. The communication device 216 may also provide access to wireline networks such as wireline IT networks, synchronization, geodetic remote sensing, and fiber optic backbone calibration networks. An artisan will recognize from the disclosure herein that many different communication networks and/or protocols may be used depending on the particular application. In the example ADS-B embodiment discussed below, for example, the communication device 216 uses the existing media access control (MAC) layer of the universal access transceiver (UAT) for communication between ADS-B nodes.

In one embodiment, the counter 214 is driven by a low cost digital clock (not shown). The counter 214 may have at least a 64 bit counting range. In one embodiment, the counter 214 is capable of running at approximately 1 million counts per second. The counter 214 may be built using cascades of counters, with 8 or 16 bit counters running at the highest speed, and driving lower rate 64 bit counters, for example. Of course, an artisan will recognize from the disclosure herein that many other configurations may also be used. Given that PhaseNet solutions ultimately solve for count-rate variabilities between nodes, their quality may be commensurate with extremely low-cost parts and very basic performance specifications.

The PhaseNet algorithms weave positioning and timing services into wireless communication networks, and may complement other location and timing technologies or function independently. The algorithms may be deployed across a wide variety of physical and network layer protocols. The PhaseNet algorithms exploit at least two aspects of a wireless network. The first aspect is that, by nature, the nodes in a wireless network are configured to pass messages between one another. The second aspect of a wireless network used by the PhaseNet algorithms is that each node has a local clock that may be used to time stamp the sending and receiving of messages.

In the general case, the messages passed between two network nodes take the form of pings and pungs. A ping transmit event includes a time stamped message from one node to another. The sending node appends to the message the value of its counter at the instant the message is transmitted. The receiving node then takes note of the value of its own counter when the message is received. The data resulting from a ping event includes, most basically, of a pair of count values. The first count is the clock value of the sending node when the ping transmit event was sent, and the second count is the clock value of a receiving node when it received the ping transmit event. The term pung is used to refer to any data communication between nodes of the network, such as sharing the data resulting from ping events, which is not itself a ping event. The general PhaseNet algorithms take the data resulting from ping events and pungs and use it to solve for timing and/or location information useful for the nodes of the network. The specific form of this information is application dependent.

The method used by the PhaseNet algorithms to determine the locations of nodes is pseudo lateration. In lateration, the distances (or differences of distances) between nodes, derived by time-of-flight measurements, are used to solve for positions of nodes. However, the PhaseNet algorithms invoke lateration as but one element of a more sophisticated structure. This is because PhaseNet synthesizes both timing and position information for each node of the network. These two elements, timing and position, are intertwined.

To determine the positions of the nodes of a network using pure lateration implies accurate timing information is available to make time-of-flight measurements. Conversely, to synchronize the clocks within a network by passing synchronization messages between nodes requires that node positions are known, so that time-of-flight delays may be subtracted out. The PhaseNet algorithms handle the linked nature of time and space by solving for both elements simultaneously. This allows Phase-Net to do the following:

Propagate position information throughout a network, even when only a few nodes have GNSS capability and/or access.

Enhance the accuracy of Inertial Navigation System (INS) by developing a network solution using INS sensors across the network.

Provide a background capability that is always available as a GNSS backup.

In the most general case, the PhaseNet algorithms start with free-running clocks on each network node and, from these, synthesize a common network time and a relative location solution for the network. Before the PhaseNet algorithms are run, there may not be pre-existing timing relationship between nodes, and no concept of what a "network time" might be. The free-running counters are used to time stamp messages passed between nodes, and the resulting time stamps are then processed by the algorithms.

Example Embodiment Using Pung Messages

The following description presents a specific implementation of the computations performed and solutions generated to achieve overall system operation using pung messages according to one embodiment.

Figure 3:
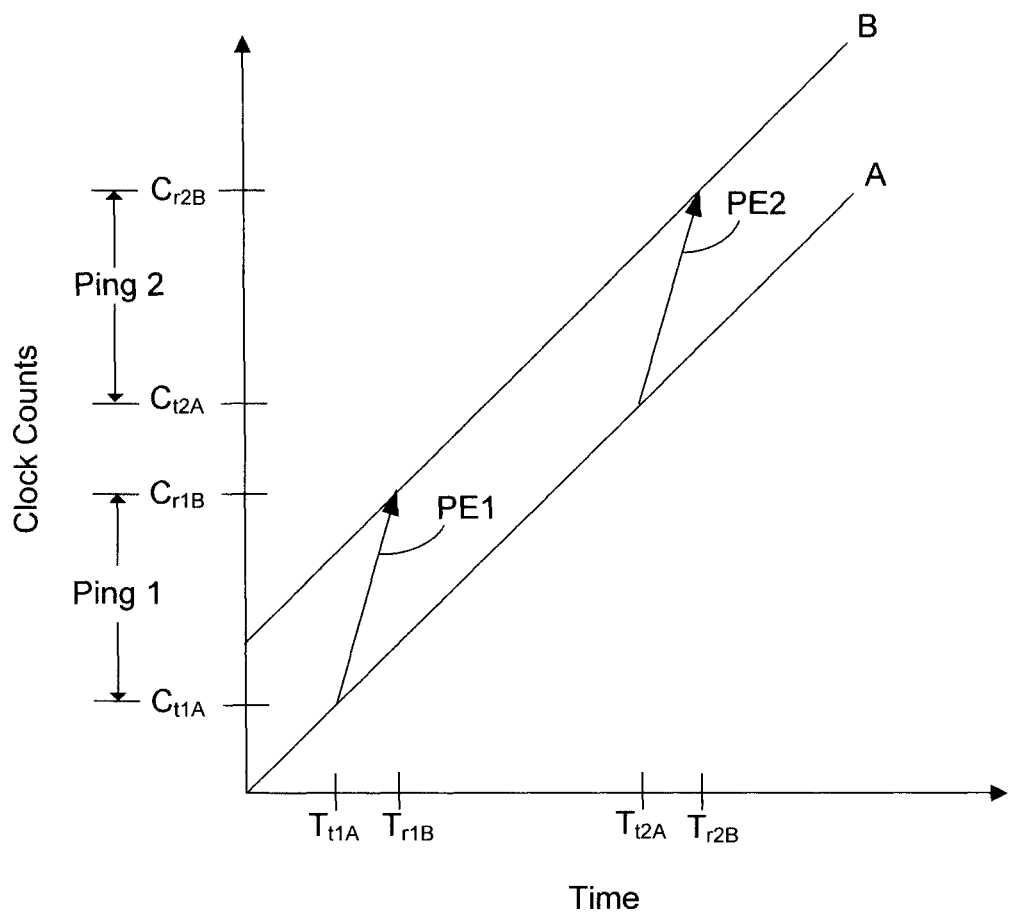
FIG. 3 is a graph showing clock counts corresponding to two time-displaced ping transmit events produced by a first node and received by a second node under conditions in which the nodes are the same distance apart from each other during the two ping transmit events.

FIG. 3 is a graph showing clock counts corresponding to two time-displaced ping events transmitted from node A and received by node B under conditions in which nodes A and B are the same distance apart from each other during two ping events. With reference to FIG. 3, a vector PE1 represents a first ping event, which has a clock count value, Ping 1, expressed as $$\text{Ping } 1 = C_{r1B} - C_{t1A}, \quad (1)$$

where $C_{t1A}$ is a clock count (or count stamp) accumulated by a counter (e.g., counter 214 shown in FIG. 2) driven by a digital clock residing at node A and transmitted by node A at a time, $T_{t1A}$, and $C_{r1B}$ is a clock count (or count stamp) accumulated by a counter driven by a digital clock residing at node B and associated with a time, $T_{r1B}$, at which node B receives the first ping transmit event produced by node A at $T_{t1A}$. A vector PE2 represents a second, later ping event, which has a clock count value, Ping 2, expressed as $$\text{Ping } 2 = C_{r2B} - C_{t2A}, \quad (2)$$

where $C_{t2A}$ is the clock count transmitted by node A at a time, $T_{t2A}$, and $C_{r2B}$ is the clock count associated with a time, $T_{r2B}$, at which node B receives the second ping transmit event produced by node A at $T_{t2A}$. The straight line (ignoring incremental count quantization) plot of clock counts as a function of time for each of nodes A and B indicates that their respective digital clocks, $CLK_A$ and $CLK_B$, operate at the same or a "system nominal" rate.

A differential clock count value representing the difference between Ping 2 and Ping 1, $\Delta\text{Ping}_{AB}$, can be expressed as $$\Delta Ping_{AB} = Ping2 - Ping1 \quad (3)$$
$$= (C_{r2B} - C_{t2A}) - (C_{r1B} - C_{t1A}).$$

The entity $\Delta\text{Ping}_{AB}=0$ when nodes A and B are the same distance apart from (i.e., not moving relative to) each other at the times of ping events PE1 and PE2. This is the situation represented in FIG. 3, in which $(T_{r1B}-T_{t1A})$ and $(T_{r2B}-T_{t2A})$ are equal.

Figure 4:
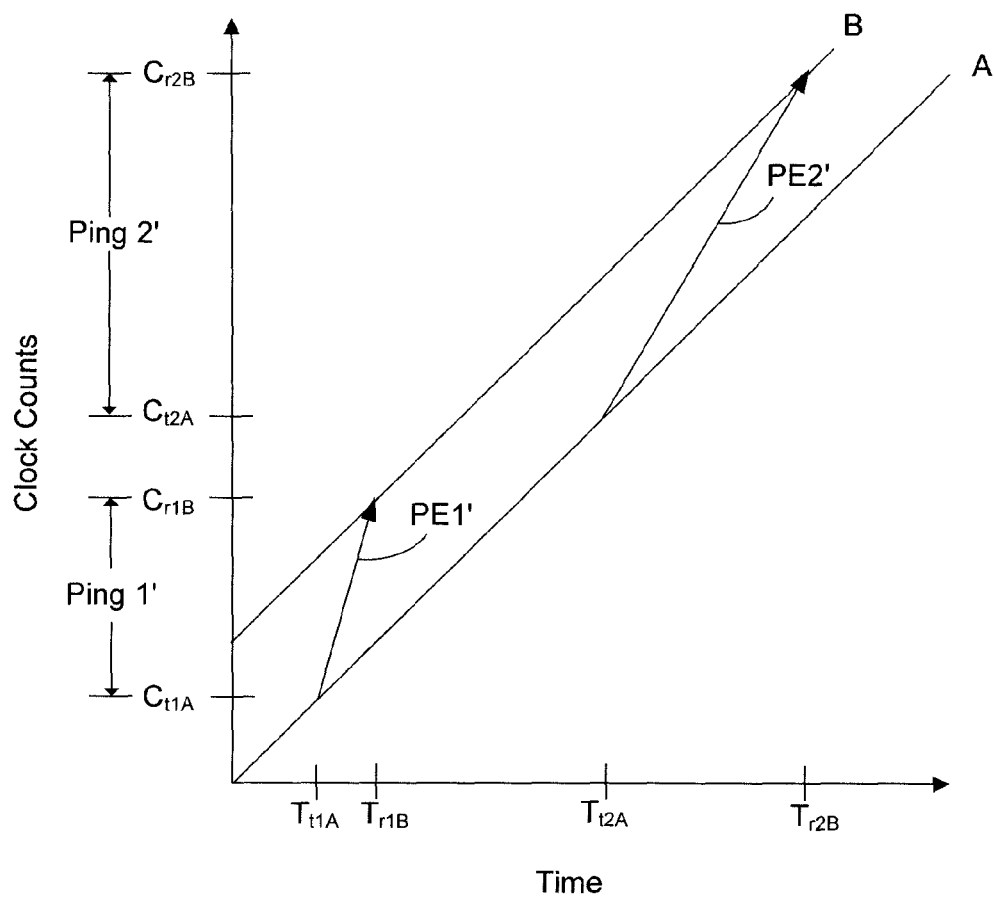
FIG. 4 is a graph showing clock counts corresponding to two time-displaced ping transmit events produced by a first node and received by a second node under conditions in which the nodes are different distances apart from each other during the two ping transmit events.

FIG. 4 is a graph showing clock counts corresponding to two time-displaced ping events transmitted from node A and received by node B under conditions in which nodes A and B are different distances apart from each other during the two ping events. With reference to FIG. 4, a vector PE1' represents a first ping event having a Ping 1' value that is the same as the Ping 1 value of vector PE1. A vector PE2' represents a second, later ping event having a Ping 2' value that is greater than the Ping 2 value of vector PE2. A change in distance between nodes A and B for the first and second ping events is expressed as $\Delta\text{Dist}_{AB}$. The inequalities $\Delta\text{Ping}_{AB}>0$ and $\Delta\text{Dist}_{AB}>0$ indicate that nodes A and B moved farther apart from each other between the times of the first and second ping events, as represented in FIG. 4. Similarly, the inequalities $\Delta\text{Ping}_{AB}<0$ and $\Delta\text{Dist}_{AB}<0$ indicate that nodes A and B moved closer to each other between the times of the first and second ping events.

Figure 5:
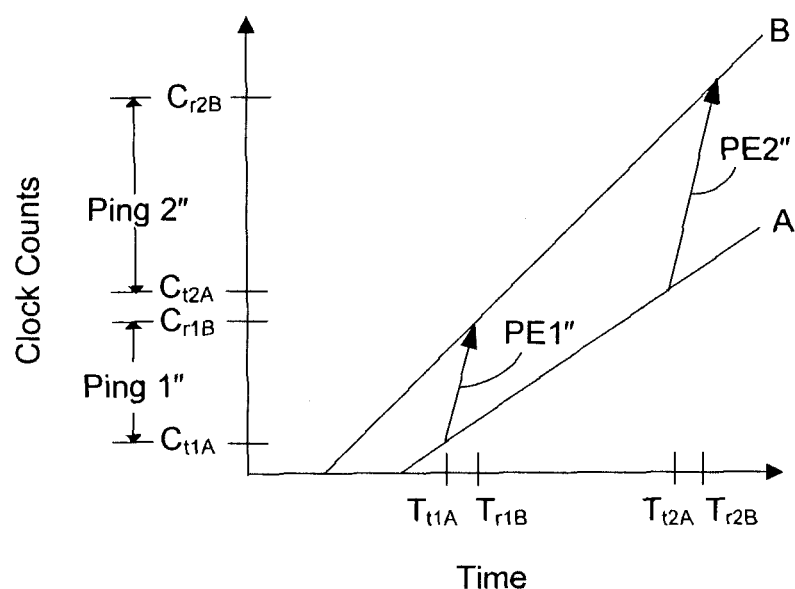
FIG. 5 is a graph showing clock counts corresponding to two time-displaced ping transmit events produced by a first node and received by a second node under conditions in which the nodes are the same distance apart from each other during the two ping transmit events but their clock rates are dissimilar.

FIG. 5 is a graph showing clock counts corresponding to two time-displaced ping events transmitted from node A and received by node B under conditions in which nodes A and B are the same distance apart from each other during the two ping events but their clock rates are dissimilar. With reference to FIG. 5, $(T_{r1B}-T_{t1A})$ and $(T_{r2B}-T_{t2A})$ are equal; therefore, nodes A and B are not moving relative to each other at the times of the first and second ping events PE1" and PE2". The clock count plots of nodes A and B indicate that they are not parallel and that the node A clock, $CLK_A$, counts at a slower rate than the count rate of the node B clock, $CLK_B$. FIG. 5 indicates that when the clock rate of $CLK_A$ decreases relative to the system nominal rate, Ping 2" increases relative to Ping 2 of FIG. 3. In general, the following relationships characterize in ping counts changes in rate of node clock A, $\Delta CLK_A$, and node clock B, $\Delta CLK_B$:

$\Delta CLK_A$ decreases $\Rightarrow \Delta\text{Ping}_{AB}$ increases $\Delta CLK_B$ decreases $\Rightarrow \Delta\text{Ping}_{AB}$ decreases.

The following two equations express, in terms of ping counts, changes in the distance between nodes A and B, assuming that ping events are also transmitted from node B and received and count stamped by node A:

$$\Delta Ping_{AB} = K_1 \Delta Dist_{AB} - K_2 \Delta CLK_A + K_3 \Delta CLK_B \quad (4)$$

$$\Delta Ping_{BA} = K_1 \Delta Dist_{BA} + K_2 \Delta CLK_B - K_3 \Delta CLK_A. \quad (5)$$

Figure 6:
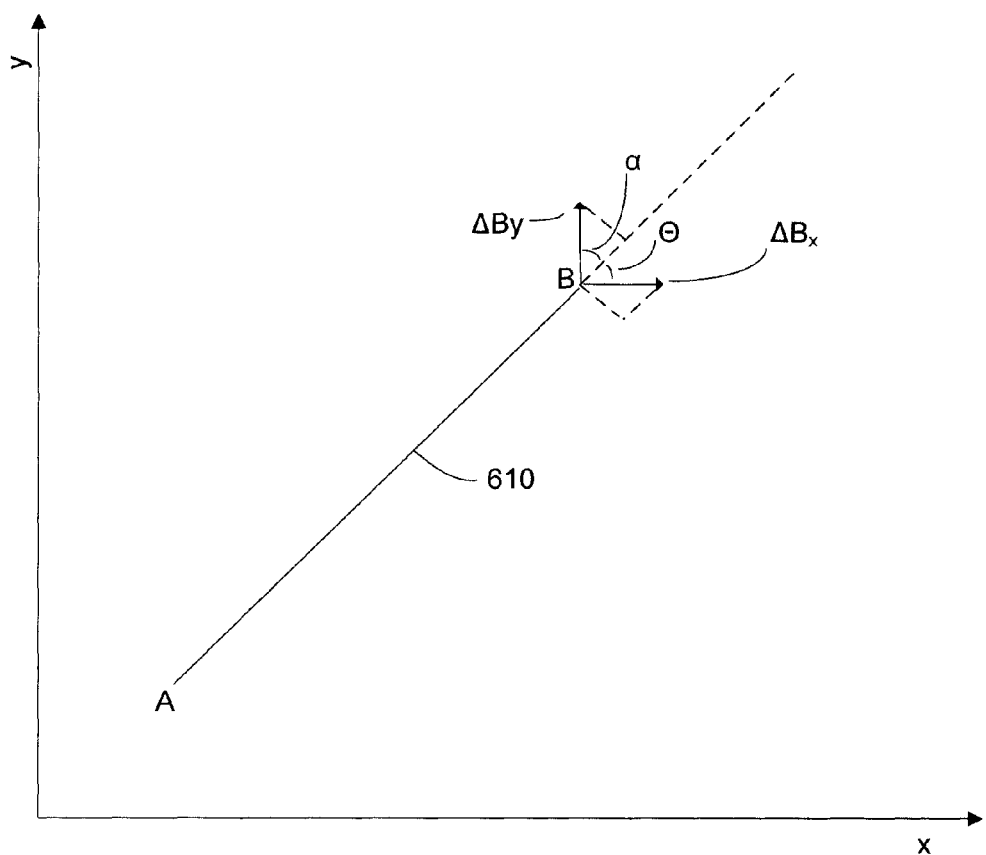
FIG. 6 is a diagram for use in illustrating the calculation of a change in distance between the first and second nodes.

FIG. 6 is a diagram for use in illustrating the calculation of $\Delta\text{Dist}_{AB}$. For small displacements during a unit ping interval (i.e., during a short interval between successive pings), the term $$\Delta Dist_{AB} = \sqrt{\Delta X_{AB}^2 + \Delta Y_{AB}^2 + \Delta Z_{AB}^2} \quad (6)$$

can be approximated. FIG. 6 is a diagram showing a straight line path segment between nodes A and B. With reference to FIG. 6, a straight line 610 connecting nodes A and B represents in x, y coordinate space the displacement of node B relative to node A for two successive ping events. FIG. 6 shows that, for short time intervals between successive ping events and when node A remains stationary, the x and y components of $\Delta\text{Dist}_{AB}$ at node B can be expressed as $\Delta B_x \cos \theta$ and $\Delta B_y \cos \alpha$, respectively, where $\Delta B_x$ and $\Delta B_y$ are the changes in the respective x and y coordinates of node B from its receipt of Ping 1 to its receipt of Ping 2, $\theta$ is the angle between line 610 and its projection onto the x axis, and $\alpha$ is the angle between line 610 and its projection onto the y axis. Similarly, in x, y, z coordinate space, the z component of $\Delta\text{Dist}_{AB}$ can be expressed as $\Delta B_z \cos \phi$.

When the three components are combined and the coordinates of node A are included, $\Delta\text{Dist}_{AB}$ can be expressed as $$\Delta Dist_{AB} = \Delta B_x \cos \theta + \Delta B_y \cos \alpha + \Delta B_z \cos \phi - [\Delta A_x \cos \theta + \Delta A_y \cos \alpha + \Delta A_z \cos \phi]. \quad (7)$$

Substituting into equation (4) the expression for $\Delta\text{Dist}_{AB}$ in equation (7) and taking into account the speed of light, c, for the E-M implementation provides $$\Delta Ping_{AB} = \Delta B_x \left(\frac{\cos\theta}{c}\right) + \Delta B_y \left(\frac{\cos\alpha}{c}\right) + \Delta B_z \left(\frac{\cos\varphi}{c}\right) + \Delta A_x \left(\frac{-\cos\theta}{c}\right) + \quad (8)$$
$$\Delta A_y \left(\frac{-\cos\alpha}{c}\right) + \Delta A_z \left(\frac{-\cos\varphi}{c}\right) - K_2 \Delta CLK_A + K_3 \Delta CLK_B.$$

Simplifying equation (8) by relabeling the constant coefficients of the terms of $\Delta Dist_{AB}$, $$\Delta Ping_{AB} = \Delta A_X K_{AX} + \Delta B_X K_{BX} + \Delta A_Y K_{AY} + \Delta B_Y K_{BY} + \Delta A_Z K_{AZ} + \Delta B_Z K_{BZ} - K_2 \Delta CLK_A + K_3 \Delta CLK_B. \quad (9)$$

Figure 7:
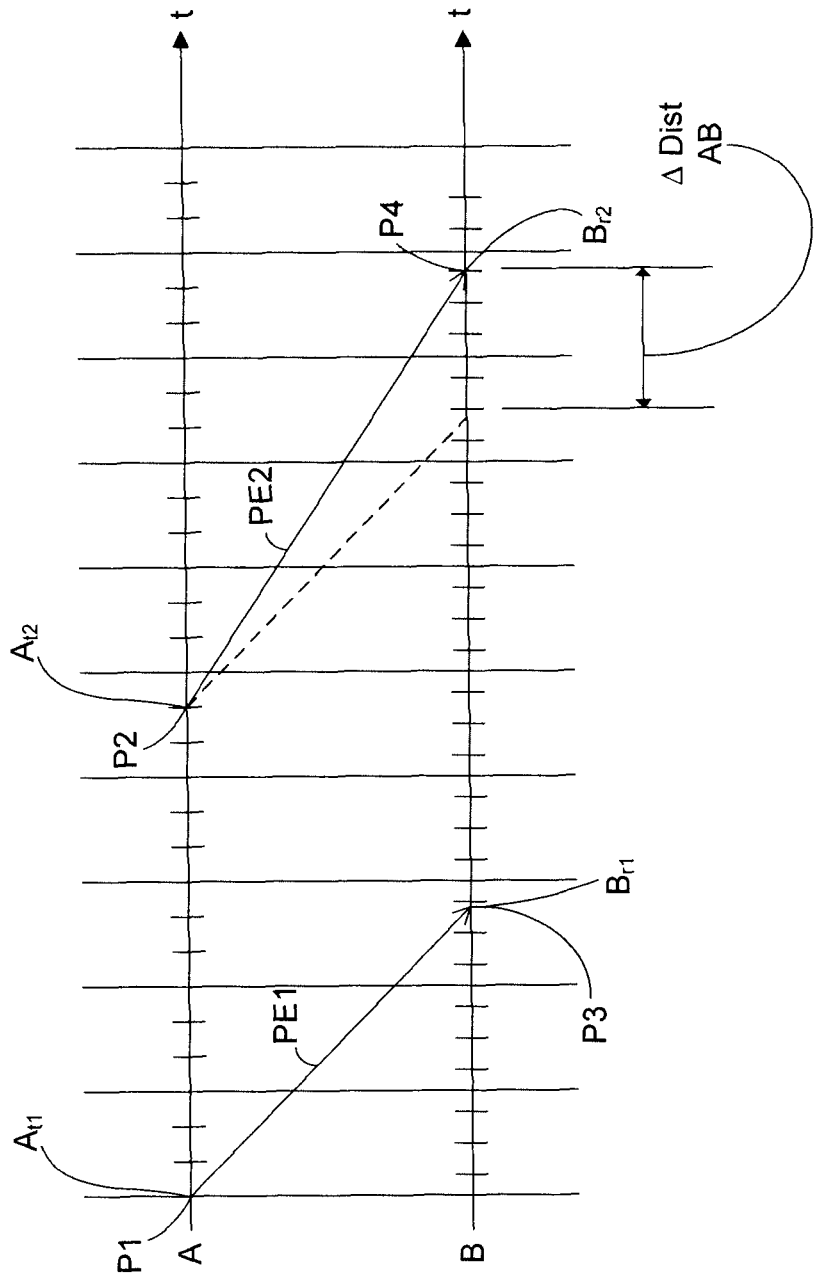
FIG. 7 is a diagram showing two timelines of ping transmit events produced by the first node and received by the second node for calculating changes in rates of the clocks of the first and second nodes.

The solution of the $\Delta CLK_A$ and $\Delta CLK_B$ terms is developed with reference to FIG. 7. In FIG. 7, the horizontal line A represents a timeline of ping transmit events produced by node A, and the horizontal line B represents a timeline of the ping receive events produced by node B. The vertical lines intersecting horizontal lines A and B are mutually spaced apart by a unit time interval, which represents the period of the system nominal clock rate. The shorter-length tick marks on lines A and B indicate the actual clock rates of $CLK_A$ and $CLK_B$, respectively. A vector PE1 represents a first ping event transmitted by a node A at a time $A_{t1}$ established by $CLK_A$ and received by node B at a time $B_{r1}$ established by $CLK_B$. A vector PE2 represents a second ping event transmitted by node A at a later time $A_{t2}$ established by $CLK_A$ and received by node B at a time $B_{r2}$ established by $CLK_B$. Transmit times $A_{t1}$ and $A_{t2}$ define respective time points $P_1$ and $P_2$, and receive times $B_{r1}$ and $B_{r2}$ define respective time points $P_3$ and $P_4$. Inspection of FIG. 7 reveals that $$\overline{P_1P_2} + \overline{P_2P_4} = \overline{P_1P_3} + \overline{P_3P_4} \quad (10)$$

The term $\overline{P_1P_2}$ represents the time interval, measured in system nominal time, between the transmission of PE1 and the transmission of PE2. Similarly, the term $\overline{P_3P_4}$ represents the system nominal time interval between the reception times for these ping events. The terms $\overline{P_2P_4}$ and $\overline{P_1P_3}$ represent the system nominal time intervals between, respectively, the transmission and the reception of PE2 and PE1. More specifically, with reference to FIG. 3, $$\overline{P_1P_2} = (C_{t2A} - C_{t1A}) - \Delta CLK_{A12} \quad (11)$$

$$\overline{P_3P_4} = (C_{r2B} - C_{r1B}) - \Delta CLK_{B12}, \quad (12)$$

where $\Delta CLK_{A12}$ and $\Delta CLK_{B12}$ represent the number of clock ticks needed to correct to the system nominal clock rate for, respectively, $CLK_A$ from the transmission time of first ping event PE1 to the transmission time of second ping event PE2 and for $CLK_B$ from the receive time of PE1 to the receive time of PE2. Moreover, with reference to FIG. 7, $$\overline{P_1P_3} = \frac{Dist_{1AB}}{c} \text{ and} \quad (13)$$

$$\overline{P_2P_4} = \frac{Dist_{2AB}}{c}, \quad (14)$$

where $Dist_{1AB}$ represents for the first ping event, PE1, the distance between nodes A and B from the transmit time recorded at node A to the receive time recorded at node B, and $Dist_{2AB}$ represents for the second ping event, PE2, the distance between nodes A and B from the transmit time recorded at node A to the receive time recorded at node B. Thus, equation (6) also can be expressed as $$\frac{\Delta Dist_{AB}}{c} = \frac{Dist_{2AB}}{c} - \frac{Dist_{1AB}}{c}. \quad (15)$$

Substituting into equation (10) the right-hand side terms of equations (11), (12), (13), and (14) provides the following expression $$(C_{t2A} - C_{t1A}) - \Delta CLK_{A12} + \frac{Dist_{2AB}}{c} = \quad (16)$$

$$\frac{Dist_{1AB}}{c} + (C_{r2B} - C_{r1B}) - \Delta CLK_{B12}.$$

Rearranging the terms of equation (10) provides $$-\Delta CLK_{A12} + \frac{Dist_{2AB}}{c} = \quad (17)$$

$$\frac{Dist_{1AB}}{c} + (C_{r2B} - C_{t2A} - C_{r1B} + C_{t1A}) - \Delta CLK_{B12}.$$

Substituting into equation (17) the left-hand side terms of equations (3) and (15) results in the following expression $$\Delta Ping_{AB} = \frac{\Delta Dist_{AB}}{c} + \Delta CLK_{B12} - \Delta CLK_{A12}, \quad (18)$$

where $\Delta CLK_{B12}$ and $\Delta CLK_{A12}$ represent corrections to, respectively, $CLK_B$ and $CLK_A$ to comport with the system nominal clock rate.

Equation (18) is in the form of the equation to which matrix algebra is applied to solve for the unknown displacement values and changes in clock rates. The matrix equation is expressed as $$g = Hf, \quad (19)$$

where g is a column vector of $\Delta$Pings, the number of which is the number of ping events minus 1; H is a two-dimensional matrix of coefficients constructed from the ping events; and f is a column vector of unknowns that include changes in clock rate and location changes in x, y, and z displacements.

Referring again to the example of ten nodes A, B, C, D, E, F, G, H, I, J shown in FIG. 1, each node listens to and records the other nine nodes' ping transmit events, yielding 9×10 or 90 ping events that are then recorded. Thus, in one embodiment, the g vector is organized in groups of 90, corresponding to roughly synchronous ping events of the 45 duplex channels existing among the ten nodes. In another embodiment, PhaseNet organizes the g vector in short snippets of information of a size equal to the length of a "harmonic block." In the example embodiment shown in FIG. 1, for example, this length is defined as 10 milliseconds or nominally 10 ping epochs for any given node. Many PhaseNet implementations may choose between 5 and 100 fundamental ping epochs per harmonic block, being a trade-off between, on the one hand, flexibility in dealing with different sampling rates on the chosen metrics, and on the other hand, inverting very large matrices. As computing resources continue to improve, the choice will slowly move beyond "100", as the pressure to worry about the size of matrices and the speed of inversions lessens.

The computation of equation (19) is carried out using harmonic blocks, in which there is a selected number of harmonic blocks for each equation and selected numbers of clock solutions and location solutions for each harmonic block. The number of system nodes can change (above a certain minimum number of nodes), depending on whether certain nodes remain in the system.

Before equation (19) is solved, all of the ping information is accumulated by at least one node in the network. Each node uses a pung broadcasting schedule according to certain embodiments to transmit to other nodes in the network the ping information the node has received. By combining ping events and pungs that have been received, a node is able to reconstruct information for all of the ping events of the network.

In the example embodiment shown in FIG. 1, an entire harmonic block's worth of accumulated ping information is sent to a node's communication device 216 (see FIG. 2) for broadcast as a pung packet to all other nodes. Nodes receiving this pung-packet message (from at least one harmonic block time in the past) store the received pung data along with its own accumulated ping information. In this example, the pung data packet includes nine other nodes' received ping data. This configuration in which all participating nodes share all information is a baseline solution example, such that any node can create a full set-wide solution. Other embodiments may designate special nodes that capture all the pung packet data and thus have the full information set necessary to calculate set-wide solutions.

In the example embodiment shown in FIG. 1, a pung structure associated with one harmonic block should have 81 other-node ping information×10 ping events per block×2 bytes per ping data point or 1,620 bytes of information if no down-sampling or compression is used. This amounts to 18,000 bytes of pung information per channel per second, which may exceed the communication channel's capacity. In certain embodiments, only 3,600 bytes of accumulated ping data per second are stored, thus limiting the data transfer rate to 10 Kbps. Thus, in certain embodiments, PhaseNet reduces "Pung Overhead," the communications demand for the pung channel, to only a small percentage of a given channel's data carrying capacity. At the very least, the pung data rate is preferably below the channel capacity. Certain embodiments compress the pung data using standard algorithms known to those skilled in the art to reduce the burden on the communication channel.

Enhanced PhaseNet Algorithms with Reduced Data Flow

In addition to using compression, or in other embodiments, enhanced PhaseNet algorithms reduce the amount of data required to be exchanged between nodes for space-time calculations. In such embodiments, each node does not transmit a digest (pung) of all the ping events it has heard throughout the network, as discussed in the embodiments above. Rather, each node produces a ping transmit event that includes its own current space-time state. The current space-time state includes the transmitting node's currently estimated location and corrected time (in the form of a count stamp). Thus, the ping transmit events used in the enhanced PhaseNet algorithms discussed herein are different than the ping transmit events used in the general PhaseNet algorithms discussed above in that they also include the transmitting node's currently estimated location.

Figure 8:
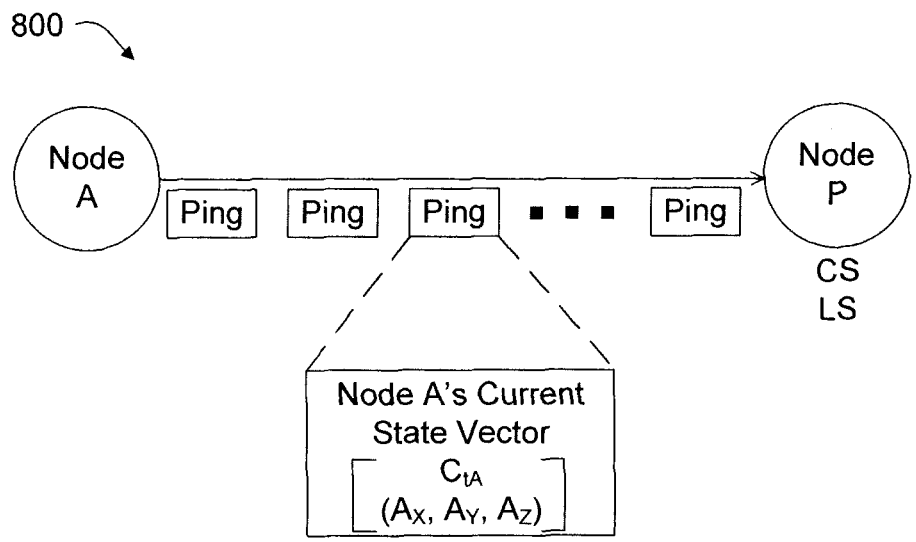
FIG. 8 is a schematic diagram of a network that includes at least two nodes according to one embodiment.

For example, FIG. 8 is a schematic diagram of a network 800 that includes at least two nodes, node A and node P, according to one embodiment. Nodes A and P may each include, for example, the elements of node 200 discussed above in relation to FIG. 2. From the viewpoint of node P, node P receives a constant stream of ping transmit events from node A, each of which includes a count stamp $C_{tA}$ corresponding to a time $T_{tA}$ when node A transmitted the particular ping transmit event. Each ping transmit event also includes a location ($A_X$, $A_Y$, $A_Z$) of node A at the transmit time $T_{tA}$. As discussed in detail below, node P constructs one or more equations from one or more corresponding ping transmit events received from node A, and combines the equation with other equations constructed from other ping transmit events received from other nodes to determine clock solutions CS and location solutions LS. A clock solution CS indicates the number of clock counts to add to node P's (free-running) clock to account for clock drift with respect to a system time, as discussed above. A location solution LS indicates the amount of correction (e.g., in X, Y, and Z directions) needed to estimate node P's position. As a service back to the network 800, node P in turn broadcasts its corrected space-time state (the newly estimated location and corrected time in the form of a count stamp) to the network 800 as a ping transmit event for use by the other nodes (e.g., including node A) in determining their own respective space-time solutions.

Figure 9:
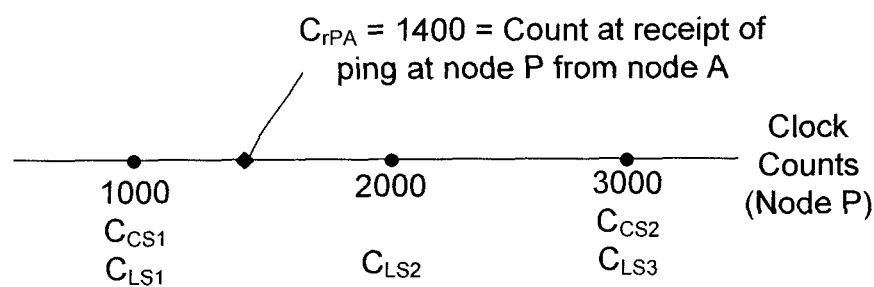
FIG. 9 is a schematic diagram illustrating example relationships between a first node's counter and a ping transmit event received from a second node according to one embodiment.

FIG. 9 is a schematic diagram illustrating example relationships between node P's counter and a ping transmit event received from node A according to one embodiment. In this example, node P receives a ping transmit event from node A at a receipt clock count $C_{rPA}$ of 1400 counts on node P's (uncorrected) counter. At intervals of 1000 clock counts, measured on node P's free-running clock, node P calculates new location solutions LS1, LS2, and LS3 (e.g., illustrated at clock counts $C_{LS1}$, $C_{LS2}$, and $C_{LS3}$). At half this rate, node P calculates new clock solutions CS1, CS2 (e.g., illustrated at clock counts $C_{CS1}$ and $C_{CS2}$).

In this example, it is assumed that the ping transmit event from node A includes the corrected clock count $C_{tA}$ of node A at the transmit time $T_{tA}$, as well as the corrected location ($A_X$, $A_Y$, $A_Z$) of node A at the transmit time $T_{tA}$. Thus, it may be assumed that there are no errors with these quantities, as well as no error with the receipt clock count $C_{rPA}$ of 1400 counts. It may also be assumed for this example that node P begins with a reasonably accurate estimation of its own location ($P_X$, $P_Y$, $P_Z$). Based on these assumptions, equation (20) below may be written in terms of the unknown clock solutions CS1, CS2 and the unknown location solutions LS1, LS2, LS3 for node P:

$$(C_{rPA} - C_{tA}) - \frac{\sqrt{(A_X - P_X)^2 + (A_Y - P_Y)^2 + (A_Z - P_Z)^2}}{c} = \quad (20)$$
$$k_X[m_A(LS1_X) + n_A(LS2_X)] + k_Y[m_A(LS1_Y) + n_A(LS2_Y)] +$$
$$k_Z[m_A(LS1_Z) + n_A(LS2_Z)] - [q_A(CS1) + r_A(CS2)],$$

where $m_A$ and $n_A$ are constants determined by the location solution clock counts $C_{LS1}$, $C_{LS2}$ in relation to the receipt clock count $C_{rPA}$, and $q_A$ and $r_A$ are constants determined by the clock solution clock counts $C_{CS1}$, $C_{CS2}$ in relation to the receipt clock count $C_{rPA}$. In particular, $m_A+n_A=1$, $q_A+r_A=1$, and for the example clock count values shown in FIG. 9:

$$m_A = \frac{C_{LS2} - C_{rPA}}{C_{LS2} - C_{LS1}} = \frac{2000 - 1400}{2000 - 1000} = 0.6, \quad (21)$$

$$n_A = \frac{C_{rPA} - C_{LS1}}{C_{LS2} - C_{LS1}} = \frac{1400 - 1000}{2000 - 1000} = 0.4, \quad (22)$$

$$q_A = \frac{C_{CS2} - C_{rPA}}{C_{CS2} - C_{CS1}} = \frac{3000 - 1400}{3000 - 1000} = 0.8, \text{ and} \quad (23)$$

$$r_A = \frac{C_{rPA} - C_{CS1}}{C_{CS2} - C_{CS1}} = \frac{1400 - 1000}{3000 - 1000} = 0.2. \quad (24)$$

The entity $k_{XYZ\_AP}=\{k_X, k_Y, k_Z\}$ may be referred to herein as the "coarse direction vector" existing between node A and node P, and the scalar components $k_X$, $k_Y$, and $k_Z$ may be referred to herein as "direction cosines" divided by c (the speed of light) of the coarse direction vector. The word "coarse" is used because strict direction is only asymptotically defined, and yet direction can be utilized nevertheless. In its strictest form, the coarse direction vector is simply the starting estimate on a convergence sequence, but for all practical purposes, a small percent error in the direction vectors is trivial compared to error analysis. One of the roles for the coarse direction vectors is to establish a Cartesian coordinate system such that motion can be resolved into orthogonal components that make sense to both the transmitting node and the receiving node (and eventually the entire set of nodes). As discussed above, initial direction vectors may be used in some embodiments based on the last known relative positions of the sending and receiving nodes.

As seen in equation (20) above, the known (or presumably known) constants include the speed of light c, the direction cosines $k_X$, $k_Y$, $k_Z$ for the vector from node A to node P, the position ($A_X$, $A_Y$, $A_Z$) of node A, the position ($P_X$, $P_Y$, $P_Z$) of node P, and the constants $m_A$, $n_A$, $q_A$, and $r_A$. Thus, equation (20) has eight unknowns, namely, location solutions $LS1_X$, $LS1_Y$, $LS1_Z$, $LS2_X$, $LS2_Y$, $LS2_Z$ and clock solutions CS1, CS2. Each time that another node is added to the network such that node P receives a ping transmit event with the additional node's current space-time state, node P creates an additional equation with these same unknowns. Thus, for a network with more than eight nodes in communication with one another, any node within the network is able to solve for the eight unknowns in equation (20) to determine its own location solutions and clock solutions.

Thus, by using ping transmit events received from a sufficient number of other nodes in the network 800, the enhanced PhaseNet algorithms disclosed herein allow each node of the network to solve for its own clock drift and location. In addition to periodically determining the clock solutions CS1, CS2 and the location solutions LS1, LS2, each node also broadcasts ping transmit events with its current space-time state. In general, a node may need to broadcast its space-time state at a time later than that of the latest solution which it has calculated. This can be dealt with through standard extrapolation methods applied to the prior solutions. With reference to FIG. 9, for example, node P may receive a sufficient number of ping transmit events during a solution period between 1000 counts and 2000 counts to solve for the clock solutions CS1, CS2 and location solutions LS1, LS2, and may transmit its own current space-time state upon reaching 3000 clock counts. In such an embodiment, node P may use the clock count $C_{CS2}$ (e.g., as its transmit count $C_{tP}$) that has been adjusted based on the solved clock solution CS2. However, equation (20) above does not provide a location solution LS3 corresponding to this clock solution CS2 at 3000 counts. Thus, node P may extrapolate the location solution LS3 using known extrapolation techniques based on the location solutions LS1, LS2 (and any previously determined location solutions).

Figure 10:
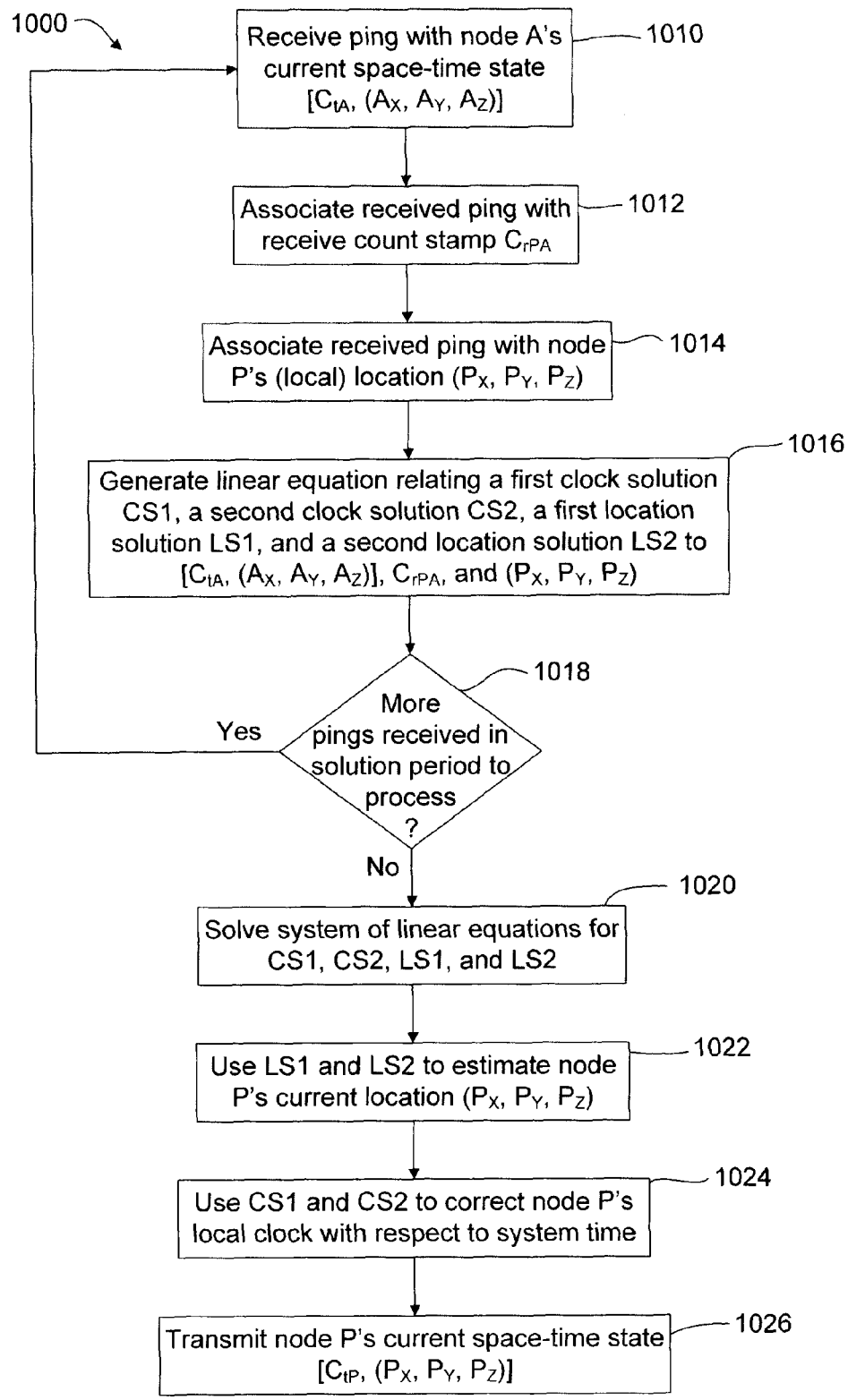
FIG. 10 is a flowchart of a method for determining location and timing information of a local node in a network according to one embodiment.

FIG. 10 is a flowchart of a method 1000 for determining location and timing information of a local node P in a network according to one embodiment. The method 1000 includes receiving 1010 a ping transmit event with node A's current space-time state. As discussed above, node A's current space-time state includes a transmit count stamp $C_{tA}$ corresponding to a time $T_{tA}$ when node A transmitted the particular ping transmit event received by node P. Thus, the transmit count stamp $C_{tA}$ is based on a remote clock operating within node A. Node A's current space-time state also includes a location ($A_X$, $A_Y$, $A_Z$) of node A at the transmit time $T_{tA}$.

After receiving the ping transmit event with node A's current space-time state, the method 1000 includes producing a ping receive event, that is to say, associating 1012 the received ping transmit event with a receive count stamp $C_{rPA}$. The receive count stamp $C_{rPA}$, corresponds to a local time, based on an independent local clock within node P, when the ping transmit event is received. The method 1000 also includes associating 1014 the received ping transmit event with node P's (local) location ($P_X$, $P_Y$, $P_Z$) at the local time when the ping transmit event is received. As discussed above, the receive count stamp $C_{rPA}$ and the local location ($P_X$, $P_Y$, $P_Z$) may be estimates based on node P's last known location and time.

The method 1000 also includes generating 1016 a linear equation relating a first clock solution CS1, a second clock solution CS2, a first location solution LS1 ($LS1_X$, $LS1_Y$, $LS1_Z$), and a second location solution LS2 ($LS2_X$, $LS2_Y$, $LS2_Z$) to node A's current space-time state [$C_{tA}$, ($A_X$, $A_Y$, $A_Z$)], the receive count stamp $C_{rPA}$, and the node P's position ($P_X$, $P_Y$, $P_Z$). As discussed above, the equation generated corresponds to equation (20) and the location solutions LS1 and LS2 include X, Y, and Z components. This provides a single equation with eight unknowns. The method 1000 then queries 1018 whether there are more ping transmit events received from other nodes during the solution period that need to be processed. With reference to FIG. 9, for example, the solution period corresponds to a predetermined number of local clock counts (e.g., 1000 clock counts) on node P between the first location solution clock count $C_{LS1}$ and the second location solution clock count $C_{LS2}$. As discussed above, at least eight ping transmit events are needed to create eight equations to solve for the eight unknowns. Thus, the method 1000 may cycle through steps 1010, 1012, 1014, and 1016 at least eight times. Although not shown in FIG. 10, in some embodiments, the method 1000 also determines that an insufficient number of ping transmit events have been received during the solution period. In such embodiments, the method 1000 may notify the system and/or a user that node P cannot determine its space-time solution for the particular solution period or that node P's space-time solution for the particular solution period is based on "unreliable information."

For illustrative purposes, the notation shown in FIG. 10 corresponds to node P receiving a ping transmit event from node A. An artisan will understand from the disclosure herein, however, that the method 1000 includes receiving ping transmit events from a plurality of different nodes and that the notation shown in FIG. 10 may be adjusted accordingly. For example, node P may also receive 1010 a ping transmit event with node B's current space-time state [$C_{tB}$, ($B_X$, $B_Y$, $B_Z$)]. In such a case, node P produces a ping receive event in which it associates 1012 the received ping transmit event from node B with a receive count stamp $C_{rPB}$, and eventually generates an equation in the form of equation (20) with the following notation:

$$(C_{rPB} - C_{tB}) - \frac{\sqrt{(B_X - P_X)^2 + (B_Y - P_Y)^2 + (B_Z - P_Z)^2}}{c} = \quad (25)$$
$$k_X[m_B(LS1_X) + n_B(LS2_X)] + k_Y[m_B(LS1_Y) + n_B(LS2_Y)] +$$
$$k_Z[m_B(LS1_Z) + n_B(LS2_Z)] - [q_B(CS1) + r_B(CS2)].$$

An artisan will recognize that equation (25) includes the same unknowns as equation (20) above, namely, location solutions $LS1_X$, $LS1_Y$, $LS1_Z$, $LS2_X$, $LS2_Y$, $LS2_Z$ and clock solutions CS1, CS2. Accordingly, the matrix equation (19) discussed above grows as ping transmit events are received from more nodes. Once node P receives ping transmit events from eight different nodes (e.g., from at least nodes A, B, C, D, E, F, G, and H), the method 1000 solves 1020 the system of linear equations (e.g., using known matrix algebra techniques) for these unknowns.

The method 1000 then uses 1022 the location solutions LS1, LS2 to estimate node P's current location ($P_X$, $P_Y$, $P_Z$). The method 1000 also uses 1024 the clock solutions CS1, CS2 to correct node P's local clock with respect to a network system time. Node P may also use the location solutions LS1, LS2 and the clock solutions CS1, CS2 to correct the space-time solutions for all of the nodes from which it received a ping transmit event. Stated another way, node P may solve the single matrix equation (19) to determine its own space-time solution and the space time solutions of all the nodes in communication with node P. As a service back to the network, node P then transmits 1026 its current space-time state [$C_{tP}$, ($P_X$, $P_Y$, $P_Z$)] to the other nodes, where $C_{tP}$ is node P's corrected clock count based on the clock solutions CS1, CS2 and ($P_X$, $P_Y$, $P_Z$) is node P's estimated position based on the location solutions LS1, LS2. An artisan will recognize from the disclosure herein that the method 1000 shown in FIG. 10 may repeat itself periodically whenever a location solution LS and/or a clock solution CS is desired. In the embodiment of FIG. 9, for example, the method 1000 may be repeated every 2000 counts so as to obtain at least two clock solutions CS1, CS2 and two location solutions LS1, LS2 during each time the method 1000 is performed.

Example ADS-B Embodiment

As discussed above, in certain embodiments, the enhanced PhaseNet technology disclosed herein is used as a backup to other timing/location systems and methods that provide initial space-time states to the nodes. In one example aviation embodiment, the enhanced PhaseNet technology disclosed herein is used as backup for an ADS-B system to reduce vulnerability to GPS outages.

The Federal Aviation Administration's (FAA's) "Next-Gen" approach to navigation and air traffic control uses ADS-B and several other emerging technologies in a comprehensive approach to improve capacity, safety, security, environmental impact of aviation, and overall efficiency. While at one level this represents significant change to various components of the airspace system, it is also an evolution of known practices and technology. This includes an increased reliance on GPS, digital databases, visualization technology, and automation tools. Thus, there is a need to reduce the system's vulnerability to GPS outages.

ADS-B promises to provide improvements to aviation for the foreseeable future. Initially, ADS-B was linked to improving safety. The improved performance has also been quantified to provide required navigation performance (RNP), which allows increased capacity and efficiency. This flexibility has led to the FAA decision to accelerate implementation of ADS-B throughout the National Airspace System (NAS). Other countries, including China, have also decided to adopt ADS-B to improve their aviation enterprise. RNP requirements seek to allow a variety of technologies to comply with the specifications to facilitate future innovation and implementation of new technology and do not dictate ADS-B or GPS use. However, as a practical matter, the vast majority of the most stringent RNP requirements are routinely met using some combination of GPS or other SATNAV augmentations. Today, capacity and safety are generally the focus of RNP. In the future, efficiency in the form of fuel savings and environmental friendliness in the form of lower carbon emissions are likely to be at least as important. The PhaseNet embodiments disclosed herein provide an innovative, software-based solution to enhance the ADS-B architecture by providing improved timing and location for a full-up system and a cost effective SATNAV backup that is independent of GNSS.

Figure 11:
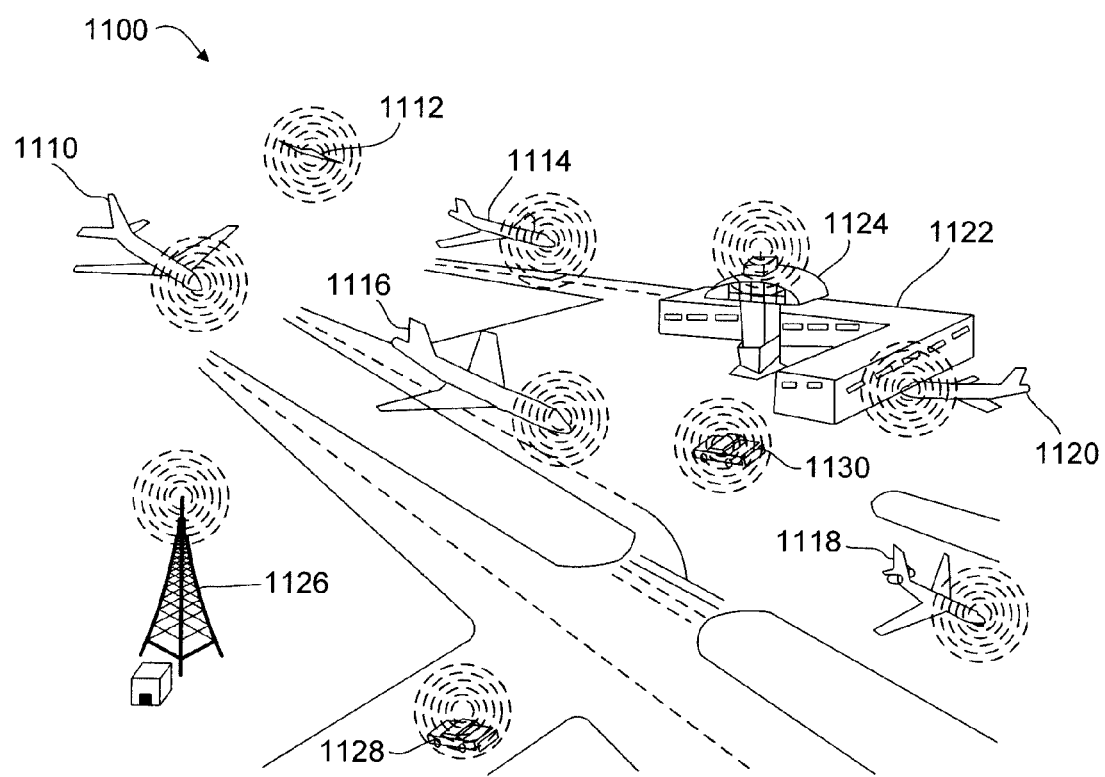
FIG. 11 schematically illustrates nodes in an Automatic Dependent Surveillance-Broadcast (ADS-B) system according to one embodiment.

FIG. 11 schematically illustrates nodes (ADS-B nodes) in an ADS-B system 1100 according to one embodiment. The ADS-B nodes may be located, for example, in aircraft 1110, 1112, 1114, 1116 that may be in the air or in the process of landing or taking off, aircraft 1118 that may be taxiing, aircraft 1120 that may parked at an airport terminal 1122, airport control towers 1124, fixed communication systems or navigation systems 1126, or other devices such as airport ground vehicles 1128, 1130. Each ADS-B node is configured to communicate (as depicted by the concentric circles illustrated in dashed lines) with one or more of the other ADS-B nodes. An artisan will recognize from the disclosure herein that many other vehicles or fixed devices may also communicate with one or more of the ADS-B nodes illustrated in FIG. 11, and thus become an ADS-B node itself.

In certain embodiments, the amount of data available for transmitting space-time information between ADS-B nodes is limited. Thus, this example uses the enhanced PhaseNet algorithms discussed above to reduce network traffic. An artisan will recognize from the disclosure herein, however, that the general PhaseNet algorithms (e.g., using both pings and pungs) may also be used in certain embodiments.

During normal operation, the ADS-B system 1100 uses GPS to provide timing and location information to aircraft 1110, 1112, 1114, 1116. When GPS becomes unavailable, however, each ADS-B node according to one embodiment determines its initial space-time state based on its last known time and location (e.g., as provided by the GPS before the outage). Each ADS-B node then transmits its initial space-time state as a ping transmit event and receives ping transmit events with space-time information from other ADS-B nodes. As discussed in detail above, each ADS-B node then uses its initial space-time state and the space-time states in the ping transmit events received from the other ADS-B nodes to update its own space-time solution. Thus, the embodiments disclosed herein allow ADS-B nodes to "ride through" periods of GPS outage with minimal degradation of system accuracy. In comparison to other backup systems, the embodiments disclosed herein provide at least the following advantages:

The embodiments discussed herein do not require new avionics in addition to that required by ADS-B, which greatly simplifies the aircraft components of the system.

The embodiments discussed herein do not require a separate ground infrastructure in addition to that required for ADS-B.

The embodiments discussed herein are independent of, and are of a significantly different mode of operation than, GNSS.

The embodiments discussed herein are globally extensible.

The embodiments discussed herein are comparably low cost because they highly leverage the ADS-B system.

The embodiments discussed herein may be deployed in ADS-B systems with low impact on communications and processing requirements. The existing media access control (MAC) layer used in the universal access transceiver (UAT) utilizes statistical time division multiplexing, with no retransmission due to collisions. This protocol is well suited to the general and enhanced PhaseNet algorithms discussed herein and ensures high probability of regular data traffic between nodes. To allow validation of ADS-B reported data, the UAT provides time stamping of both transmitted and received packets. Thus, these same time stamps may be used with the embodiments discussed herein so that no hardware modifications to the UAT are required to provide time stamping of messages. In certain embodiments, minimal changes to the ADS-B system to incorporate the PhaseNet algorithms discussed herein include dedicating a modest number of additional bits to PhaseNet pung data (for general PhaseNet algorithms).

Further, because the PhaseNet algorithms discussed herein may be implemented separately by each ADS-B node, there is no centralized single point of failure of a PhaseNet-enabled system. Instead, the failure of any single component of the augmented ADS-B/PhaseNet system results in a minimal loss of overall system performance.

PhaseNet technology is well suited for current and developing technologies. Modern digital communication systems allow time stamping of messages to be accomplished with a negligible increase in radio complexity. Further, the computing power required to implement PhaseNet algorithms is readily available in modern cockpits. In addition, there has been a many orders of magnitude improvement in storage capacity relative to capacity, size, and power consumption. These trends have come so far so fast that smart phones have an abundance of all three enabling technologies, (DSP, processing, and storage) compared, for example, to the technology used the last time men walked on the moon.

Thus, PhaseNet technology is in complete contrast to the other proposed SATNAV backups, most of which were operational during World War II. These include radar, long range aid to navigation (LORAN), distance measuring equipment (DME), and inertial navigation systems (INS). FIG. 12 illustrates a table that compares limitations and features of various SATNAV backup systems under consideration for aviation. In the table shown in FIG. 12 a "multilateration" system is an approach where aircraft periodically send signals that are received at several ground locations that determine aircraft position by the time difference of arrival principle; calculated positions are then transmitted back to the aircraft. Multilateration is generally the same as direction finding (DF) used since the dawn of aviation as a primary and backup radio navigation technique.

In summary of this example embodiment, GPS has become a global utility and the aviation community has adopted the capabilities made available from SATNAV services. In aviation, however, there are high consequences of GPS/GNSS unreliability which can be catastrophic. Long term satellite navigation outages may incur wide-spread economic paralysis without a viable infrastructure component to provide reliable aviation services independent of GPS. This has led to a consensus that some sort of satellite navigation backup should be part of the NextGen air transportation system. Nearly all the proposed solutions to provide backup are vintage systems that do not take technological advances and are looking at the world through the rear view mirror. They have been abandoned primarily because they are expensive to maintain and provide inadequate accuracy. The PhaseNet embodiments discussed herein have several very beneficial qualities that can cost effectively provide a robust backup capability. The PhaseNet embodiments discussed herein also have the potential to work with a full-up GPS/GNSS system to provide additional accuracy and precision that can enable better, fuel saving routes and minimize carbon emissions in a way that looks forward to a better aviation enterprise ahead.

It will be understood to those having skill in the art that many changes may be made to the details of the above-described embodiments without departing from the underlying principles of the invention. The scope of the present invention should, therefore, be determined only by the following claims.

The invention claimed is:

1. A method of determining location and timing information of a local node in a network, the method comprising:
receiving pings from a plurality of nodes in the network, the pings comprising a local clock solution of a transmitting node and a location of the transmitting node corresponding to when the local clock solution is transmitted, the local clock solution based on an independent local clock of the transmitting node as correlated with a network time by one or more clock solutions;
for each ping received within a predetermined time interval, associating a receive count stamp with the received ping, the receive count stamp corresponding to a local time when the ping is received, the local time based on an independent local clock of a receiving node; and
processing the local clock solution of the transmitting node, the location of the transmitting node and the receive count stamps corresponding to the pings received within the predetermined time interval to determine one or more clock solutions for correlating the independent local clock of the receiving node with the network time, and to determine one or more location solutions for estimating a local location of the receiving node.

2. The method of claim 1, further comprising:
processing the one or more clock solutions and the one or more location solutions to determine a local space-time state comprising:
a local count stamp corresponding to a local time when the local space-time state is transmitted, the local time based on the independent local clock as correlated with the network time by the one or more clock solutions; and
a local location corresponding to when local space-time state is transmitted, the transmitted local location estimated using the one or more location solutions and the local count stamp.

3. The method of claim 2, further comprising:
transmitting the local space-time state to the plurality of nodes in the network.

4. The method of claim 1, further comprising:
providing an initial local space-time state based on data received from a timing and/or location system.

5. The method of claim 4, further comprising:
transmitting the initial local space-time state to the plurality of nodes in the network.

6. The method of claim 4, further comprising:
determining the receive count stamps associated with each ping received during an initial solution period based on the initial local space-time state.

7. The method of claim 4, further comprising:
determining the local location associated with each ping received during an initial solution period based on the initial local space-time state.

8. The method of claim 4, further comprising:
determining an initial direction vector between a remote node and a local node based on the data received from the timing and/or location system.

9. The method of claim 4, wherein the timing and/or location system comprises a satellite based global positioning system (GPS).

10. The method of claim 4, wherein the timing and/or location system comprises an Automatic Dependent Surveillance-Broadcast (ADS-B) system, and wherein at least one of the plurality of nodes is located within an aircraft, the method further comprising:

determining that satellite based navigation used by the ADS-B system is unavailable; and in response to the unavailability of the satellite based navigation, determining the one or more clock solutions and the one or more location solutions.

11. A system for determining location and timing information, the system comprising:

a plurality of nodes in communication with one another, each node comprising:

an independent clock for generating count stamps;

a communication device for receiving remote pings from the other nodes, the remote pings comprising a local clock solution of a transmitting node and a location of the transmitting node corresponding to when the local clock solution is transmitted, the local clock solution based on an independent local clock of the transmitting node as correlated with a network time by one or more clock solutions; and a processor for:

associating each remote ping with a receive count stamp based on the independent clock;

associating each remote ping with a local location; and processing the local clock solution, the location of the transmitting node and, the receive count stamps to determine one or more clock solutions for correlating the independent clock with the network time, and to determine one or more location solutions for estimating a local location.

12. The system of claim 11, wherein the processor of each node is further configured to process the one or more clock solutions and the one or more location solutions to determine a local space-time state, and wherein the communication device of each node is further configured to transmit its local space-time state to the other nodes in the network.

13. The system of claim 11, wherein the communication device of each node is further configured to receive an initial local space-time state based on data received from a timing and/or location system and to transmit the initial local space-time state to the other nodes, and wherein the processor of each node is further configured to determine the receive count stamps and the local locations associated with each received remote ping based on the initial local space-time state.

14. The system of claim 13, wherein the timing and/or location system comprises a satellite based global positioning system (GPS).

15. The system of claim 13, wherein the timing and/or location system comprises an Automatic Dependent Surveillance-Broadcast (ADS-B) system, wherein at least one of the plurality of nodes is located within an aircraft, and wherein the processor of each node is further configured to:

determine that satellite based navigation used by the ADS-B system is unavailable; and in response to the unavailability of the satellite based navigation, determine the one or more clock solutions and the one or more location solutions.

* * * * *